United States Patent
Slater et al.

(10) Patent No.: US 10,440,188 B2
(45) Date of Patent: Oct. 8, 2019

(54) TECHNIQUES FOR PROVIDING LOCATION DATA IN EMERGENCY CALLS

(71) Applicant: Bandwidth, Inc., Raleigh, NC (US)

(72) Inventors: Jay Slater, Superior, CO (US); Larry Reeder, Denver, CO (US)

(73) Assignee: BANDWIDTH, INC., Raleigh, NC (US)

( * ) Notice: Subject to any disclaimer, the term of this patent is extended or adjusted under 35 U.S.C. 154(b) by 0 days.

(21) Appl. No.: 16/122,059

(22) Filed: Sep. 5, 2018

(65) Prior Publication Data
US 2019/0098140 A1 Mar. 28, 2019

Related U.S. Application Data

(60) Provisional application No. 62/563,921, filed on Sep. 27, 2017.

(51) Int. Cl.
| | |
|---|---|
| *H04M 7/14* | (2006.01) |
| *H04M 7/00* | (2006.01) |
| *H04M 3/51* | (2006.01) |
| *H04W 4/90* | (2018.01) |
| *H04W 4/02* | (2018.01) |
| *H04M 3/42* | (2006.01) |

(52) U.S. Cl.
CPC ..... *H04M 7/0075* (2013.01); *H04M 3/42357* (2013.01); *H04M 3/5116* (2013.01); *H04W 4/023* (2013.01); *H04W 4/90* (2018.02)

(58) Field of Classification Search
CPC .......... H04M 7/0075; H04M 3/42357; H04M 3/5116; H04W 4/023; H04W 4/90
USPC ...................... 379/37–52; 455/404
See application file for complete search history.

(56) References Cited

U.S. PATENT DOCUMENTS

| | | | |
|---|---|---|---|
| 2012/0314699 A1* | 12/2012 | Qiu ................ | H04L 29/06027 370/352 |
| 2014/0273911 A1* | 9/2014 | Dunn .................. | H04W 4/90 455/404.1 |
| 2015/0373517 A1* | 12/2015 | Zermeno ............. | H04W 4/90 455/404.2 |

* cited by examiner

*Primary Examiner* — Maria El-Zoobi
(74) *Attorney, Agent, or Firm* — Kilpatrick Townsend & Stockton LLP

(57) ABSTRACT

Disclosed are techniques for handling emergency calls via an emergency call routing system. A Voice-over Internet Protocol (VoIP) emergency call server may be configured to receive a session initiation protocol (SIP) INVITE for an emergency call from a telephone number serviced by a telecommunication service provider (TSP) SIP call server. The SIP INVITE message header may include multiple location objects including a registered geo-coded address location object associated with the telephone number placing the emergency call, and a location object comprised of lat-long coordinates determined at the time the emergency call is placed. The emergency call server may determine whether the registered geo-coded address and the lat-long coordinates are within a specified distance of one another. When the registered geo-coded address and the lat-long coordinates are within a specified distance of one another, the emergency call server may use the geo-coded address as the location object when handling the emergency call. However, when the registered geo-coded address and the lat-long coordinates are not within a specified distance of one another, the emergency call server may use the lat-long coordinates as the location object when handling the emergency call.

21 Claims, 4 Drawing Sheets

200

300

400

TECHNIQUES FOR PROVIDING LOCATION DATA IN EMERGENCY CALLS

CROSS-REFERENCE TO RELATED APPLICATIONS

This application claims priority to and the benefit of U.S. Provisional Application No. 62/563,921 filed Sep. 27, 2017 entitled "Techniques For Providing Location Data In Emergency Calls".

BACKGROUND

Many telecommunication devices or telephony endpoints operate using the Voice-over IP (VoIP) standard. VoIP telecommunications differs from the legacy circuit-switched telephony systems in many ways. One major difference is the ability for a VoIP telephony endpoint to be nomadic or even mobile whereas a circuit-switched telephony endpoint is in a fixed and known location. Thus, when a circuit-switched telephony endpoint makes an emergency call (e.g., a 911 call), the location of the telephony endpoint (and therefore the caller) is known because that particular telephony endpoint has been assigned a physical address that is stored in a database. The address may be easily included in the call to an emergency dispatcher located in a Public Safety Answering Point (PSAP). The PSAP dispatcher may then send aid directly to the caller.

VoIP telephony endpoints, however, may be moved and operated virtually anywhere an Internet connection is available. As a result, the exact location of the telephony endpoint (caller) cannot be precisely known to the PSAP dispatcher. One administrative solution requires a VoIP telephony service provider to collect a valid registered address for the customer. When a customer makes an emergency call over the VoIP network, the telephone service provider (or their emergency services provider) uses the registered address on file and passes it to the PSAP dispatcher. This works well enough if the customer has not relocated the telephony endpoint since the last registered address update. But, if the customer is accessing his VoIP telephony services from a location that is not the same as the registered address on file, the location data sent to the PSAP will be inaccurate and may lead to significant delays in receiving any needed aid.

What is needed is a technique to better produce an accurate location of a VoIP telephony endpoint to a PSAP dispatcher when the VoIP telephony endpoint makes an emergency call.

DETAILED DESCRIPTION

Figure 1:
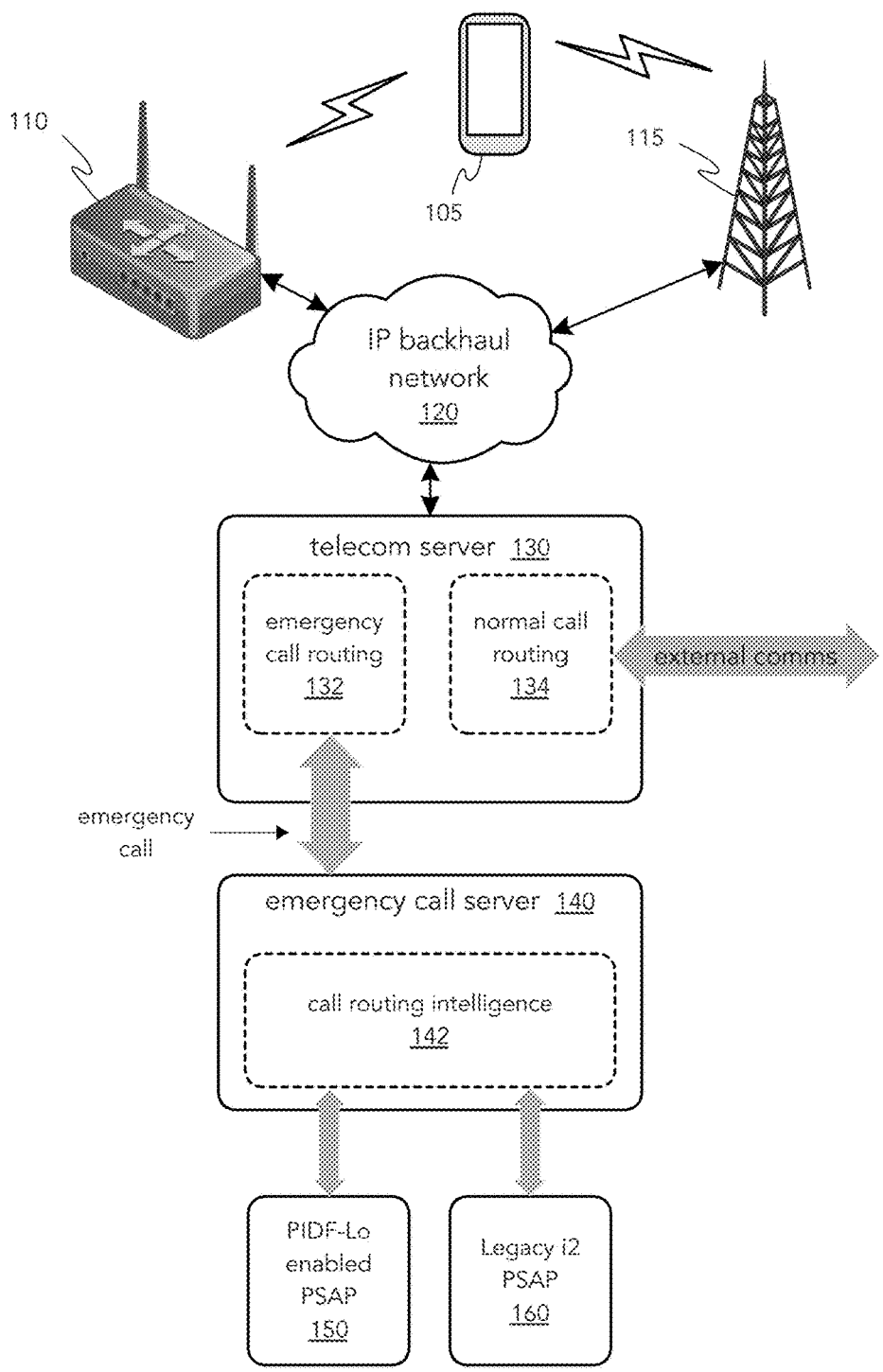
FIG. 1 illustrates an embodiment of a first networked environment for communication between a telephony endpoint and a PSAP.

Embodiments described herein may be directed to techniques for providing location data in emergency calls. The systems, devices, and methods described herein may be embodied in and performed by telecommunication endpoint devices, telecommunications network servers, and other computer devices, and software instructions executed by some or all of such devices, as will be explained in detail below.

In one embodiment, for example, an apparatus may include a memory and logic, at least a portion of the logic implemented in circuitry coupled to the memory. In one or more such embodiments, the logic may receive an indication of an emergency call from a telephony endpoint to another telephony endpoint within a PSAP manned by a dispatcher. This logic may be embodied in the calling telephony endpoint, the PSAP telephony endpoint, one or more telecommunication servers between the calling and PSAP telephony endpoints, or all of them.

As used herein, the term "telephony endpoint" may refer to a wireline or wireless VoIP enabled telecommunication device, such as one or more of a cellular phone, mobile phone, landline or soft client executing on a computer based device.

As used herein, the term "communication session" may refer to any two-way exchange of information between two or more telephony endpoints. Communication sessions may include voice, data, video, and multimedia communication sessions, or any other type of data communication sessions or messaging exchanges, such as in a call.

As used herein, the term "communication link" may refer to a physical or logical channel that connects two or more communication devices.

In some embodiments, a communication link may be a signaling link or a media link. In various embodiments, a communication session may be established via one or more communication links. In various such embodiments, one or more media streams may be transmitted over the one or more communication links. In some embodiments, a telecommunication server may be situated between telephony endpoints potentially making the telecommunication server an endpoint in a communication link of one or more communication links that establish a communication session. In some such embodiments, the telecommunications server may be hosted within an IP network such as, for instance, the Internet or a LAN/WAN accessible to the Internet.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and include apparatus specially constructed for the required purpose. Various embodiments also relate to apparatus or systems for performing these operations. These apparatuses may be specially constructed for the required purpose or may include a general-purpose computer. The required structure for a variety of these machines will be apparent from the description given.

Reference is now made to the drawings, wherein like reference numerals are used to refer to like elements throughout. In the following description, for purpose of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modification, equivalents, and alternatives within the scope of the claims.

FIG. 1 illustrates an embodiment of a first networked environment 100 for communication between a telephony endpoint 105 and a PSAP 150, 160. In the disclosure herein, there may be two types of PSAPs—a PIDF-Lo enabled PSAP 150 and a legacy i2 PSAP 160. Unless specifically referred to using the corresponding diagram reference number, use of the term PSAP shall apply to both the PIDF-Lo enabled 150 and legacy i2 160 PSAPs. PIDF-Lo is an acronym meaning Presence Information Data Format Location Object and represents the latest, as of this writing, location data format object included with VoIP based calls to emergency numbers such as 9-1-1.

In the networked environment 100, a telephony endpoint 105 may be communicable with the telecom server 130 of its telephony service provider over an IP backhaul network 120 such as, for instance, the Internet. To gain access to the IP backhaul network 120, telephony endpoint 105 may connect to an IP access point 110 using the 802.11 WiFi protocol or may connect to a cellular radio tower/base station 115 using a cellular IP protocol such as, for instance, the Long-Term Evolution (LTE) protocol. The telecom server 130 receives call requests from the telephony endpoint 105 and can determine whether or not the call is an emergency (e.g., 9-1-1) call or a normal call. If it is a normal call, the internal logic and processing labeled normal call routing 134 may handle the call. If it is an emergency call, the internal logic and processing labeled emergency call routing 132 may handle the call. Emergency calls may be routed to an emergency call server 140 that may or may not be co-located with the telecom server 130. The emergency call server 140 includes logic to analyze the call and determine the appropriate PSAP to route the call. The appropriate PSAP may be the one that is designated to serve the location from which the emergency call originates. The emergency call server 140 determines if the appropriate PSAP may be a PIDF-Lo enabled PSAP 150 or a legacy i2 PSAP 160 based on, for instance, a database of PSAPs and their capabilities. The emergency call server may then route the emergency call in a format expected by the PSAP. The PSAP may then answer the call and establish a media path with the telephony endpoint 105 that placed the call permitting the caller to communicate with the PSAP dispatcher.

Figure 2:
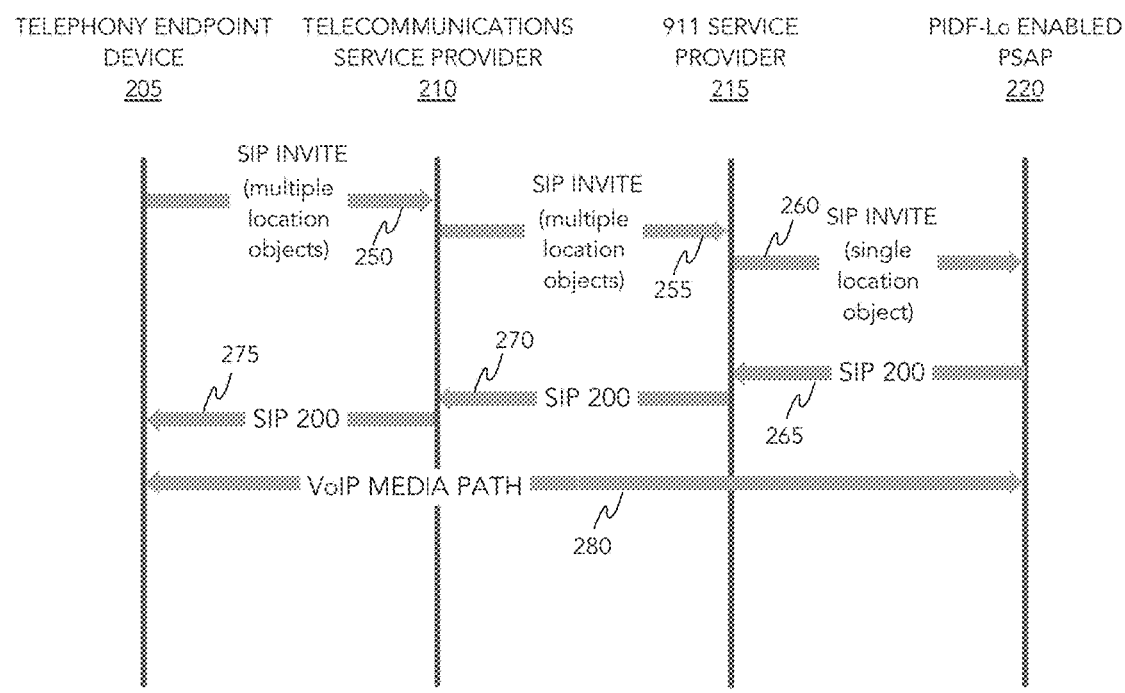
FIG. 2 illustrates an embodiment of a first emergency call flow.

FIG. 2 illustrates an embodiment of a first emergency call flow 200. This call flow describes the messaging exchange between a telephony endpoint 205 and a PIDF-Lo enabled PSAP 220 as well as the intermediate components between them. The telephony endpoint 205 is a customer or subscriber of a Voice-over Internet Protocol (VoIP) telecommunications service provider 210. The telecommunications service provider 210 may utilize a separate 911 service provider 215 to process, route, and manage emergency calls to 911. It should be noted that the telecommunications service provider 210 and 911 service provider 215 may be co-located and under the control of the same entity.

Upon signing up for telephony service, the customer owning the telephony endpoint 205 undergoes a provisioning process whereby a registered address for the telephony endpoint is established and stored with its telephone number. In addition, the telecommunication service provider 210 informs the 911 service provider 215 of the registered address to be associated with the telephone number of the telephony endpoint 205. This address is then verified as valid and stored in a table or database that links the telephone number and the valid address.

Subsequently, when a telephony endpoint 205 is used to dial 9-1-1, a SIP invite message 250 to establish the call is sent to the telecommunications service provider 210. The telephony endpoint 205 may be further configured to include additional location objects in the SIP message header. The additional location objects may include lat-long coordinates from a GPS chip, or a pre-configured label like "Jay-home". The label Jay-home may be one of many known to the telephony endpoint 205 and 911 service provider 215. For instance, Jay-home may be determined by the telephony endpoint 205 based on the known coordinates of the MAC_address of the network interface providing access to the telephony endpoint 205. This could be the home router.

The SIP_INVITE message is then forwarded 255 to the 911 service provider 215. The 911 service provider 215 then processes the message to determine the appropriate PSAP 220 to which to route the call. This processing is further described in FIG. 4 below. Once the appropriate PSAP 220 has been determined, the SIP_INVITE message is again forwarded 260 to that PSAP 220. The PSAP 220 acknowledges the call and returns a SIP 200 message 265, 270, 275 that propagates back through the 911 service provider 215, the telecommunications service provider 210 and back to the telephony endpoint 205 at which time an audio VoIP media path 280 is established between the telephony endpoint 205 and the PSAP 220 allowing the caller and 911 dispatcher to communicate.

Figure 3:
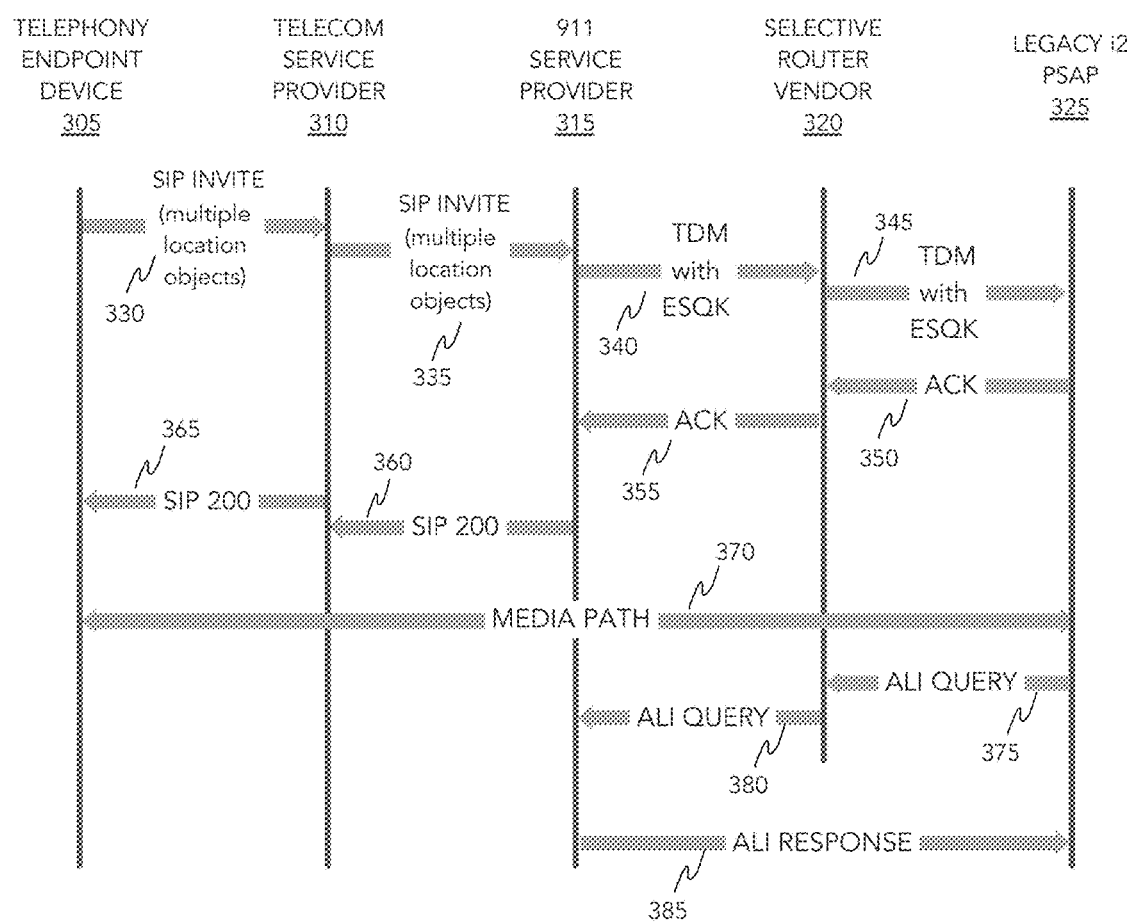
FIG. 3 illustrates an embodiment of a second emergency call flow.

FIG. 3 illustrates an embodiment of a second emergency call flow 300. This call flow describes the messaging exchange between a telephony endpoint 305 and a legacy i2 PSAP 325 as well as the intermediate components between them. As in the last embodiment described above, the telephony endpoint 305 is a customer or subscriber of a Voice-over Internet Protocol (VoIP) telecommunications service provider 310. The telecommunications service provider 310 may utilize a separate 911 service provider 315 to process, route, and manage emergency calls to 911. It should be noted that the telecommunications service provider 310 and 911 service provider 315 may be co-located and under the control of the same entity. In this embodiment, the PSAP 325 is a TDM legacy i2 PSAP that is not PIDF-Lo enabled.

Just as above, upon signing up for telephony service, the customer owning the telephony endpoint 305 undergoes a provisioning process whereby a registered address for the telephony endpoint is established and stored with its telephone number. In addition, the telecommunication service provider 310 informs the 911 service provider 315 of the registered address to be associated with the telephone number of the telephony endpoint 305. This address is then verified as valid and stored in a table or database that links the telephone number and the valid address.

Subsequently, when a telephony endpoint 305 is used to dial 9-1-1, a SIP invite message 330 to establish the call is sent to the telecommunications service provider 310. The telephony endpoint 305 may be further configured to include additional location objects in the SIP message header. As described above, the additional location objects may include lat-long coordinates from a GPS chip, or a pre-configured label like "Jay-home". The label Jay-home may be one of many known to the telephony endpoint 305 and 911 service provider 315. For instance, Jay-home may be determined by the telephony endpoint 305 based on the known coordinates of the MAC_address of the network interface providing access to the telephony endpoint 305. This could be the home router.

The SIP_INVITE message is then forwarded 335 to the 911 service provider 315. The 911 service provider 315 then processes the message to determine the appropriate PSAP 325 to which to route the call. This processing is further described in FIG. 4 below. Once the appropriate PSAP 325 has been determined, the SIP_INVITE message is again forwarded 340 to that PSAP 325. In this example, the appropriate PSAP 325 is a legacy i2 PSAP meaning it is not PIDF-Lo enabled nor is it IP enabled for VoIP telephony. Thus, the call must be routed through a selective router 320 for conversion to TDM. The 911 service provider 315 creates and sends a TDM_ESQK message 340 that is forwarded to the selective router 320. The TDM_ESQK message includes the appropriate PSAP 325 to forward the call that was determined based on an analysis of the location objects in the original SIP_INVITE from the telephony endpoint 305. The selective router 320 then routes the TDM_ESQK message 345 to the appropriate PSAP 325. The PSAP 325 responds with an acknowledgment message 350 that gets propagated through the selective router 320 and back to the 911 service provider 315. The 911 service provider 315 converts the TDM acknowledgment to a SIP based SIP 200 acknowledgement 360 that is passed through the telecommunications service provider 310 and back to the telephony endpoint 305. An audio media path 370 is then established between the telephony endpoint 305 and the PSAP 325 allowing the caller and 911 dispatcher to communicate. The PSAP 325 also performs an automatic location information (ALI) lookup by sending an ALI query 375 to the selective router 320 that gets passed back to the 911 service provider 315. The 911 service provider 315 performs the lookup and sends an ALI response message 385 back to the PSAP 325 via the selective router 320 to confirm the location of the telephony endpoint 305 is valid.

Figure 4:
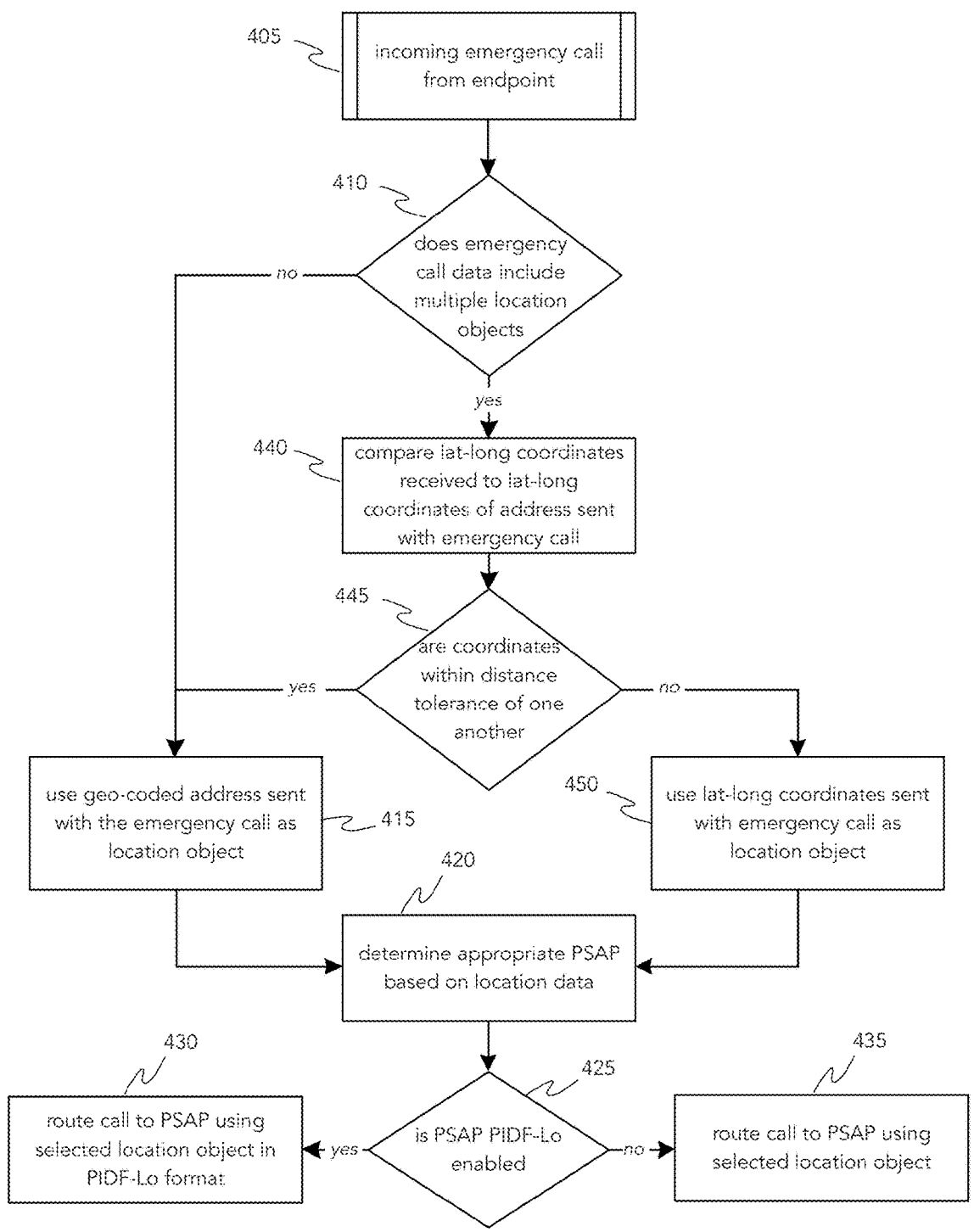
FIG. 4 illustrates an embodiment of a first logic flow.

FIG. 4 illustrates an embodiment of a first logic flow 400. Logic flow 400 is from the perspective of the emergency call server 140. The emergency call server 140 receives an emergency call (e.g., 911 call) originating from a telephony endpoint 105 at block 405. In a VoIP environment, this typically means a SIP_INVITE message that contains, at a minimum, the telephone number of the telephony device 105 making the call. The SIP_INVITE message may also include one or more additional location objects packed in the message. Additional location objects may include lat-long coordinates from a GPS chip, or a pre-configured label like "Jay-home". The label Jay-home may be one of many known to the telephony endpoint 105 and emergency call server 140. For instance, Jay-home may be determined by the telephony endpoint 105 based on the known address coordinates of the MAC_address of the network interface providing access to the telephony endpoint 105. This could be the home router. There could be other network interfaces with known address coordinates including network access points for other locations to which the telephony device has previously connected.

The emergency call server 105 unpacks the SIP_INVITE message to determine if it includes multiple location objects at block 410. For instance, the message may include an address label as described above as well as actual lat-long coordinates derived from a GPS chip in the telephony endpoint 105. If the message does not include multiple location objects, the emergency call server will default to using the geo-coded address that is automatically included with the call as the location object at block 415. The emergency call server 140 next determines the appropriate PSAP 150, 160 based on the location object. This may involve identifying the PSAP 150, 160 that serves the location from where the telephony endpoint 105 is calling at block 420. Once the PSAP 150, 160 is identified, the emergency call server 140 checks whether that PSAP is a PIDF-Lo enabled PSAP 150 or not at block 425. If it is a PIDF-Lo enabled PSAP 150, the emergency call server 140 routes the call to the PSAP 150 using the PIDF-Lo at block 430. Otherwise, if it is a legacy i2 PSAP 160, the emergency call server 140 routes the call to PSAP 160 using the TDM_ESQK format for the location object at block 435.

Referring back to block 410, if the emergency call server 140 determines the call does include multiple location objects, specifically lat-long coordinates, it will compare the lat-long coordinates to that of the other location object sent with the call at block 440. If the lat-long coordinates are within a threshold distance of the geo-coded address location object, the emergency call server 140 will use the geo-coded location object at block 415 to determine which PSAP to route the call at block 420. Otherwise, if the lat-long coordinates are outside a threshold distance of the geo-coded address location object, the emergency call server 140 will use the lat-long coordinates as the location object at block 450 to determine which PSAP to route the call at block 420. From here, the process flows as described above. Specifically, once the PSAP 150, 160 is identified, the emergency call server 140 checks whether that PSAP is a PIDF-Lo enabled PSAP 150 or not at block 425. If it is a PIDF-Lo enabled PSAP 150, the emergency call server 140 routes the call to the PSAP 150 using the PIDF-Lo at block 430. Otherwise, if it is a legacy i2 PSAP 160, the emergency call server 140 routes the call to PSAP 160 using the TDM_ESQK format for the location object at block 435.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or rewriteable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

The invention claimed is:

1. An emergency call routing system, comprising:
a Voice-over Internet Protocol (VoIP) emergency call server configured to:
receive a session initiation protocol (SIP) INVITE for an emergency call from a telephony endpoint associated with a telephone number serviced by a telecommunication service provider (TSP) SIP call server, the SIP INVITE message header including multiple location objects including: (i) a registered geo-coded address location object associated with the telephone number placing the emergency call, and (ii) a location object comprised of lat-long coordinates determined at the time the emergency call is placed;
determine whether the registered geo-coded address and the lat-long coordinates are within a specified distance of one another;
when the registered geo-coded address and the lat-long coordinates are within a specified distance of one another, use the geo-coded address as the location object when handling the emergency call;
when the registered geo-coded address and the lat-long coordinates are not within a specified distance of one another, use the lat-long coordinates as the location object when handling the emergency call;
determine a public safety answering point (PSAP) to route the emergency call based on location object; and
when the PSAP is presence information data format location object (PIDF-Lo) capable:
route the emergency call to the PSAP with the PIDF-Lo;
receive a SIP acknowledgement from the PSAP;
forward the SIP acknowledgement back to the telephony endpoint such that a media path may be created between the telephony endpoint and the PSAP.

2. The emergency call routing system of claim 1, the lat-long coordinates derived from a GPS chip on the telephony endpoint that placed the emergency call.

3. The emergency call routing system of claim 1, another location object comprising a MAC address of a network interface for the telephony endpoint that placed the emergency call, the MAC address associated with a location known to the VoIP emergency call server.

4. An emergency call routing method, comprising:
receiving a session initiation protocol (SIP) INVITE for an emergency call from a telephony endpoint associated with a telephone number serviced by a telecommunication service provider (TSP) SIP call server, the SIP INVITE message header including multiple location objects including: (i) a registered geo-coded address location object associated with the telephone number placing the emergency call, and (ii) a location object comprised of lat-long coordinates determined at the time the emergency call is placed;
determining whether the registered geo-coded address and the lat-long coordinates are within a specified distance of one another;
when the registered geo-coded address and the lat-long coordinates are within a specified distance of one another, using the geo-coded address as the location object when handling the emergency call;
when the registered geo-coded address and the lat-long coordinates are not within a specified distance of one another, using the lat-long coordinates as the location object when handling the emergency call;
determining a public safety answering point (PSAP) to route the emergency call based on location object; and
when the PSAP is presence information data format location object (PIDF-Lo) capable:
routing the emergency call to the PSAP with the PIDF-Lo;
receiving a SIP acknowledgement from the PSAP;
forwarding the SIP acknowledgement back to the telephony endpoint such that a media path may be created between the telephony endpoint and the PSAP.

5. The emergency call routing method of claim 4, the lat-long coordinates derived from a GPS chip on the telephony endpoint that placed the emergency call.

6. The emergency call routing method of claim 4, another location object comprising a MAC address of a network interface for the telephony endpoint that placed the emergency call, the MAC address associated with a location known to the VoIP emergency call server.

7. At least one machine-readable non-transitory medium comprising a set of instructions executable on a computing device operating as a Voice-over Internet Protocol (VoIP) emergency call server to cause the computing device to route emergency calls by:
 receiving a session initiation protocol (SIP) INVITE for an emergency call from a telephony endpoint associated with a telephone number serviced by a telecommunication service provider (TSP) SIP call server, the SIP INVITE message header including multiple location objects including: (i) a registered geo-coded address location object associated with the telephone number placing the emergency call, and (ii) a location object comprised of lat-long coordinates determined at the time the emergency call is placed;
 determining whether the registered geo-coded address and the lat-long coordinates are within a specified distance of one another;
 when the registered geo-coded address and the lat-long coordinates are within a specified distance of one another, using the geo-coded address as the location object when handling the emergency call;
 when the registered geo-coded address and the lat-long coordinates are not within a specified distance of one another, using the lat-long coordinates as the location object when handling the emergency call;
 determining a public safety answering point (PSAP) to route the emergency call based on location object; and
 when the PSAP is presence information data format location object (PIDF-Lo) capable:
  routing the emergency call to the PSAP with the PIDF-Lo;
  receiving a SIP acknowledgement from the PSAP;
  forwarding the SIP acknowledgement back to the telephony endpoint such that a media path may be created between the telephony endpoint and the PSAP.

8. The at least one machine-readable non-transitory medium of claim 7, the lat-long coordinates derived from a GPS chip on the telephony endpoint that placed the emergency call.

9. The at least one machine-readable non-transitory medium of claim 7, wherein another location object comprising a MAC address of a network interface for the telephony endpoint that placed the emergency call, the MAC address associated with a location known to the VoIP emergency call server.

10. An emergency call routing system, comprising:
 a Voice-over Internet Protocol (VoIP) emergency call server configured to:
 receive a session initiation protocol (SIP) INVITE for an emergency call from a telephony endpoint associated with a telephone number serviced by a telecommunication service provider (TSP) SIP call server, the SIP INVITE message header including multiple location objects including: (i) a registered geo-coded address location object associated with the telephone number placing the emergency call, and (ii) a location object comprised of lat-long coordinates determined at the time the emergency call is placed;
 determine whether the registered geo-coded address and the lat-long coordinates are within a specified distance of one another;
 when the registered geo-coded address and the lat-long coordinates are within a specified distance of one another, use the geo-coded address as the location object when handling the emergency call;
 when the registered geo-coded address and the lat-long coordinates are not within a specified distance of one another, use the lat-long coordinates as the location object when handling the emergency call;
 determine a public safety answering point (PSAP) to route the emergency call based on location object; and
 when the PSAP is not presence information data format location object (PIDF-Lo) capable:
  convert the SIP_INVITE to a TDM_ESQK message that includes the determined PSAP;
  send the TDM_ESQK message to a selective router for routing to the determined PSAP;
  receive a TDM acknowledgement message from the PSAP by way of the selective router;
  convert the TDM acknowledgement message to a SIP acknowledgement;
  forward the SIP acknowledgement back to the telephony endpoint such that a media path may be created between the telephony endpoint and the PSAP.

11. The emergency call routing system of claim 10, the lat-long coordinates derived from a GPS chip on the telephony endpoint that placed the emergency call.

12. The emergency call routing system of claim 10, another location object comprising a MAC address of a network interface for the telephony endpoint that placed the emergency call, the MAC address associated with a location known to the VoIP emergency call server.

13. An emergency call routing method, comprising:
 receiving a session initiation protocol (SIP) INVITE for an emergency call from a telephony endpoint associated with a telephone number serviced by a telecommunication service provider (TSP) SIP call server, the SIP INVITE message header including multiple location objects including: (i) a registered geo-coded address location object associated with the telephone number placing the emergency call, and (ii) a location object comprised of lat-long coordinates determined at the time the emergency call is placed;
 determining whether the registered geo-coded address and the lat-long coordinates are within a specified distance of one another;
 when the registered geo-coded address and the lat-long coordinates are within a specified distance of one another, using the geo-coded address as the location object when handling the emergency call; and
 when the registered geo-coded address and the lat-long coordinates are not within a specified distance of one another, using the lat-long coordinates as the location object when handling the emergency call;
 determining a public safety answering point (PSAP) to route the emergency call based on location object; and
 when the PSAP is not presence information data format location object (PIDF-Lo) capable:
  converting the SIP_INVITE to a TDM_ESQK message that includes the determined PSAP;
  sending the TDM_ESQK message to a selective router for routing to the determined PSAP;

receiving a TDM acknowledgement message from the PSAP by way of the selective router;

converting the TDM acknowledgement message to a SIP acknowledgement;

forwarding the SIP acknowledgement back to the telephony endpoint such that a media path may be created between the telephony endpoint and the PSAP.

14. The emergency call routing method of claim 13, the lat-long coordinates derived from a GPS chip on the telephony endpoint that placed the emergency call.

15. The emergency call routing method of claim 13, another location object comprising a MAC address of a network interface for the telephony endpoint that placed the emergency call, the MAC address associated with a location known to the VoIP emergency call server.

16. At least one machine-readable non-transitory medium comprising a set of instructions executable on a computing device operating as a Voice-over Internet Protocol (VoIP) emergency call server to cause the computing device to route emergency calls by:

receiving a session initiation protocol (SIP) INVITE for an emergency call from a telephony endpoint associated with a telephone number serviced by a telecommunication service provider (TSP) SIP call server, the SIP INVITE message header including multiple location objects including: (i) a registered geo-coded address location object associated with the telephone number placing the emergency call, and (ii) a location object comprised of lat-long coordinates determined at the time the emergency call is placed;

determining whether the registered geo-coded address and the lat-long coordinates are within a specified distance of one another;

when the registered geo-coded address and the lat-long coordinates are within a specified distance of one another, using the geo-coded address as the location object when handling the emergency call; and when the registered geo-coded address and the lat-long coordinates are not within a specified distance of one another, using the lat-long coordinates as the location object when handling the emergency call;

determining a public safety answering point (PSAP) to route the emergency call based on location object; and when the PSAP is not presence information data format location object (PIDF-Lo) capable:

converting the SIP_INVITE to a TDM_ESQK message that includes the determined PSAP;

sending the TDM_ESQK message to a selective router for routing to the determined PSAP;

receiving a TDM acknowledgement message from the PSAP by way of the selective router;

converting the TDM acknowledgement message to a SIP acknowledgement;

forwarding the SIP acknowledgement back to the telephony endpoint such that a media path may be created between the telephony endpoint and the PSAP.

17. The at least one machine-readable non-transitory medium of claim 16, the lat-long coordinates derived from a GPS chip on the telephony endpoint that placed the emergency call.

18. The at least one machine-readable non-transitory medium of claim 16, wherein another location object comprising a MAC address of a network interface for the telephony endpoint that placed the emergency call, the MAC address associated with a location known to the VoIP emergency call server.

19. The emergency call routing system of claim 10, the VoIP emergency call server further configured to: receive an ALI query from the PSAP by way of the selective router, the ALI query to validate the location object supplied to the PSAP; and respond to the ALI query with an ALI response validating the location object.

20. The emergency call routing method of claim 13, comprising: receiving an ALI query from the PSAP by way of the selective router, the ALI query to validate the location object supplied to the PSAP; and responding to the ALI query with an ALI response validating the location object.

21. The at least one machine-readable non-transitory medium of claim 16, the set of instructions executable on a computing device operating as a Voice-over Internet Protocol (VoIP) emergency call server to cause the computing device to route emergency calls by: receiving an ALI query from the PSAP by way of the selective router, the ALI query to validate the location object supplied to the PSAP; and responding to the ALI query with an ALI response validating the location object.

\* \* \* \* \*